Z. WASHBURN.
Car Wheel.
No. 97,329. Patented Nov. 30, 1869.
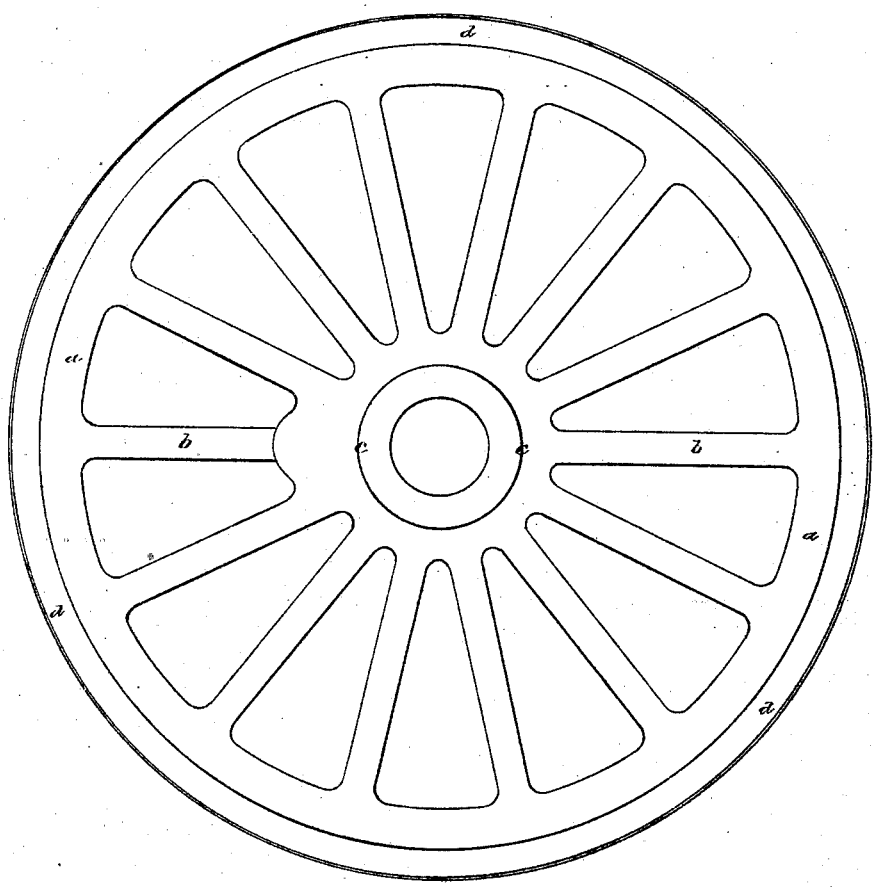

UNITED STATES PATENT OFFICE.

ZADOCK WASHBURN, OF HOPEDALE, MASSACHUSETTS.

IMPROVEMENT IN RAILWAY-CAR WHEELS.

Specification forming part of Letters Patent No. 97,329, dated November 30, 1869.

*To all whom it may concern:*

Be it known that I, ZADOCK WASHBURN, of Hopedale, of the county of Worcester and State of Massachusetts, have made a new and useful invention having reference to Railway-Car Wheels; and I do hereby declare the same to be fully described in the following specification, the accompanying drawing exhibiting a side view of one of my improved car-wheels.

The purpose of my mode of making the wheel is to compose the rim of cast-iron and an annular tire or re-enforce of rolled or hammered cast-steel, and to form a union of the two at their surfaces in contact.

I accomplish this in manner which I will now proceed to describe. In the accompanying drawing the wheel-rim *a*, the spokes *b*, and the hub *c* are to be supposed to be of cast-iron, and the re-enforce or circumscribing tire *d* to be either of wrought-iron or of steel.

In carrying out my process of making this wheel, which is also applicable to the manufacture of many analogous articles—that is, articles which have a body of cast-iron and a circumscribing re-enforce of wrought-iron or steel—I proceed as follows:

I first heat the re-enforce up to a temperature which will enable me to render fluid and run upon its inner surface a flux or composition consisting of one part (by weight) of sal-ammonia to fifteen parts (by weight) of borax. After having applied the composition to the surface, I next heat the re-enforce or tire up to a welding temperature, after which I place it within the mold or matrix to be used in casting or giving form to the cast-iron portion of the wheel. Immediately afterward I run into the mold the iron in a molten state until the mold may have been properly filled by it.

The re-enforce will at once be very much increased in temperature by the cast metal, so much so that where the two may be in contact the re-enforce will be fused by, and so as to weld firmly to, the cast metal.

As the tire or re-enforce will expand more than the cast-iron, it will be found that, during the process of cooling of the two, the contraction of the former will be a little greater than that of the latter, so that it will be impossible for the cast-iron to draw away and separate from the re-enforce during the process of cooling. Thus the two will be firmly welded together.

By my process I overcome, by the greater power of shrinkage of the re-enforce of wrought-iron or steel, the tendency of the cast-metal body, while contracting, to draw away and separate from the re-enforce, and were I not first to expand the re-enforce to a welding-heat, or to as high a temperature as I could well get it without its melting, and while at such a temperature cast the iron against it, I could not in most cases produce the effect or prevent the cast-iron and the re-enforce from cooling without a rupture of one or the other, or a separation of one from the other; nor could I prevent the steel from being injured by the cast metal.

I am aware that a cast-iron wheel after having been made and cooled has had a steel or wrought-iron tire placed upon it by the process of heating the two and shrinking it on the wheel. Therefore I make no claim thereto. Nor do I claim the common and well-known process of welding a piece of wrought-iron or a piece of steel to cast-iron by molding the cast-iron upon the steel or wrought-iron without previously heating the steel or wrought-iron to a welding temperature and casting the metal against it when so heated.

I am aware that it is not new to heat a cylinder of cast-iron and lay it in a mold, and cast upon and around the circumference while so heated a body or annulus of steel or copper. I make no claim to this, nor do I claim the heating of a plate of steel and casting a body of iron against it while so heated, a flux being used for the purpose of preventing oxidation, and aiding in effecting a union of the metals.

In carrying out my invention or improvement, I cast the iron within or against a heated rolled steel ring, and in this way I make a wheel or cylinder re-enforced with a circumscribing body of steel to better advantage, and when made it is a different article, for I employ for the tire steel which, after being cast, has been subjected to the process of hammering or rolling, or both. Steel cast against a body of cast-iron is brittle and liable to crack. It has not the tenacity of cast and rolled steel. Thus it will be seen that a wheel as made by me has a steel re-enforce which has been first cast and next subjected to the process of hammering or rolling, or both, whereby the arrangement of the particles of the metal is changed so as to destroy the frangibility of it, and render it tough and tenacious.

Furthermore, cast-steel and cast-iron, when heated to a like temperature, expand unequally, the cast-steel expanding more than the cast-iron.

From this it will be seen that when we heat and expand the re-enforce or steel ring prior to casting the iron-body within it, we are enabled to cast a greater amount of iron into it than we could were it not heated, the additional amount of cast-iron as the temperature diminishes in the cooling process operating to prevent separation of the cast-iron body from the re-enforce; but when a cylinder of cast-iron is so heated and placed in a mold the expansion of the metal diminishes the space for the reception of the steel to be cast about the cylinder, so that when cooling of the metals take place there is a liability of a separation or imperfect union of the two metals, and we do not attain the advantage of the increase of the cast metal which results when the annular re-enforce is heated and the iron body cast within it.

Thus, in my wheel I secure the advantages which rolled or hammered cast-steel has over unrolled or unhammered cast-steel, and also a better union or weld of the steel and cast-iron, from the causes above mentioned. I thus can make a railway-car wheel having a cast-steel tire and a cast-iron body, and possessing highly-important advantages over one made with a cast-steel re-enforce or tire cast on the cast-iron body.

I claim—

The improved manufacture, as described, consisting of a cast-iron wheel or body thereof, and a rolled or hammered cast-steel tire or re-enforce combined or welded together by the process of heating the re-enforce and applying to it a welding composition, and subsequently raising it to a welding temperature and finally casting against its inner surface the cast-iron body, as specified.

ZADOCK WASHBURN.

Witnesses:
R. H. EDDY,
SAMUEL N. PIPER.